(12) United States Patent
Su et al.

(10) Patent No.: US 11,575,800 B1
(45) Date of Patent: Feb. 7, 2023

(54) SYSTEM AND METHOD FOR SERVER CONNECTION USING MULTIPLE NETWORK ADAPTERS

(71) Applicant: Toshiba TEC Kabushiki Kaisha, Shinagawa-ku (JP)

(72) Inventors: William Su, Riverside, CA (US); Christopher Nguyen, Lake Forest, CA (US)

(*) Notice: Subject to any disclaimer, the term of this patent is extended or adjusted under 35 U.S.C. 154(b) by 0 days.

(21) Appl. No.: 17/378,028

(22) Filed: Jul. 16, 2021

(51) Int. Cl.
| | |
|---|---|
| *G06F 15/00* | (2006.01) |
| *G06F 3/12* | (2006.01) |
| *G06K 1/00* | (2006.01) |
| *H04N 1/00* | (2006.01) |
| *G06Q 10/10* | (2012.01) |
| *G06F 9/54* | (2006.01) |
| *G06Q 20/12* | (2012.01) |

(52) U.S. Cl.
CPC ....... *H04N 1/00477* (2013.01); *G06F 3/1204* (2013.01); *G06F 3/1231* (2013.01); *G06F 3/1259* (2013.01); *G06F 9/542* (2013.01); *G06Q 10/10* (2013.01); *H04N 1/00244* (2013.01); *G06F 3/1288* (2013.01); *G06Q 20/127* (2013.01)

(58) Field of Classification Search
CPC ............ H04N 1/00477; H04N 1/00244; G06F 3/1204; G06F 3/1231; G06F 3/1259; G06F 3/1288
USPC ............................... 358/1.15, 1.13, 1.14, 1.1
See application file for complete search history.

(56) References Cited

U.S. PATENT DOCUMENTS

| | | | |
|---|---|---|---|
| 2015/0331646 A1* | 11/2015 | Taniguchi | G06F 3/1289 358/1.15 |
| 2021/0099950 A1* | 4/2021 | Shibata | H04W 12/55 |
| 2021/0136238 A1* | 5/2021 | Ormond | H04N 1/32539 |

* cited by examiner

*Primary Examiner* — Douglas Q Tran
(74) *Attorney, Agent, or Firm* — Ulmer & Berne LLP; John X. Garred

(57) ABSTRACT

A system and method for managing print services between multifunction peripherals and a print server includes a connector server. The connector server subscribes to event notifications from each multifunction peripheral through two or more network adapters. Events are relayed from the connector server to the print server, irrespective as to which network adapter receives them. The connector server also relays web content between the multifunction peripheral and the print server.

20 Claims, 6 Drawing Sheets

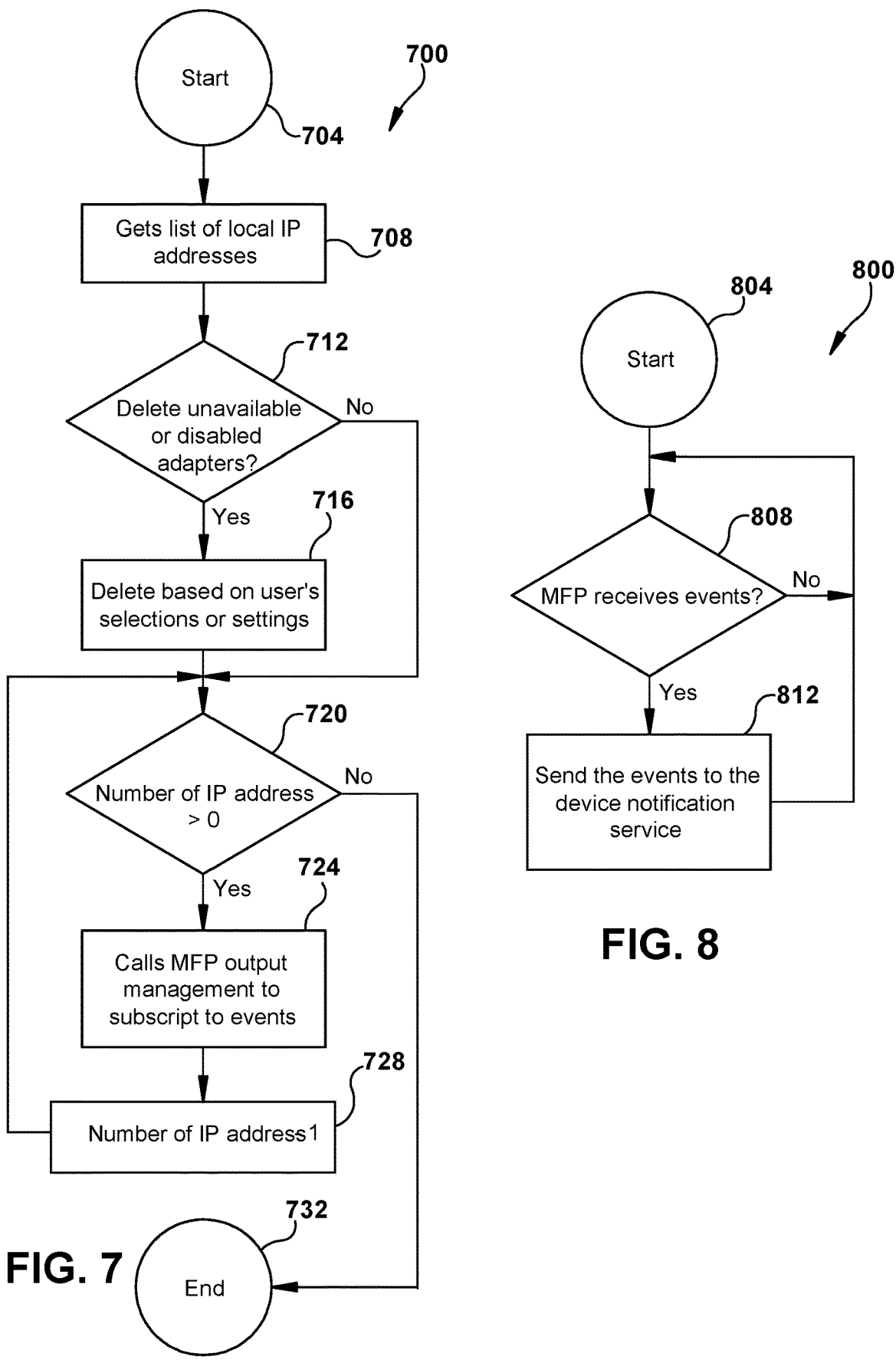

SYSTEM AND METHOD FOR SERVER CONNECTION USING MULTIPLE NETWORK ADAPTERS

TECHNICAL FIELD

This application relates generally to printing via a print server. The application relates more particularly to a connector server between a multifunction peripheral and a print server wherein the connector server includes multiple network adapters.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Printing for larger enterprises may be managed with a print server, such as with managed print services offered by Pharos or PaperCut. In such systems, a user can send a document to a print server, and release their document for printing at any MFP by logging in. Login can be by a smart card, such as a near-field communication (NFC) device or a radio frequency identification device (RFID). Login can also be accomplished by entering login information on a MFP user interface, or by scanning a barcode or QR code on an MFP.

BRIEF DESCRIPTION OF THE DRAWINGS

Various embodiments will become better understood with regard to the following description, appended claims and accompanying drawings wherein:

FIG. 7 is a flowchart of an example embodiment of connector server operation; and FIG. 8 is a flowchart of an example embodiment of multifunction peripheral operation.

DETAILED DESCRIPTION

Figure 1:
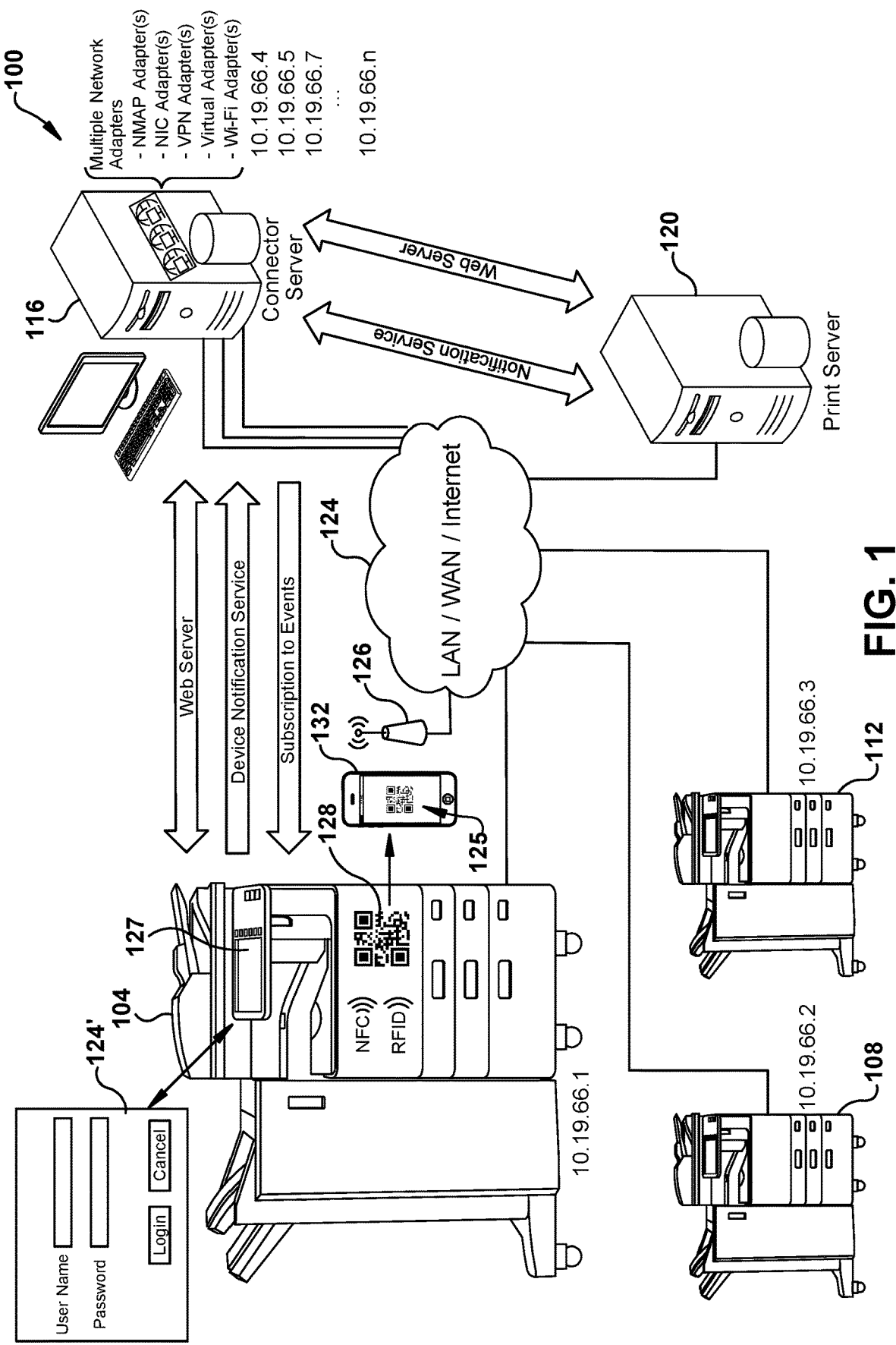
FIG. 1 an example embodiment of a system for server connection using multiple network adapters.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

In certain networked printing environments, a connector server is disposed between MFPs and a print server. A connector server, such as one running Toshiba TEC's eConnector software, provides a connection between the MFPs and a print server, such as-party server, such as Pharos Uniprint, through a software application called a connector. While Pharos Uniprint is used in example embodiment herein, it is to be understood that any suitable print management system can be used. A connector server can also do account management, such as quota management or cost assessments. A connector can also subscribe to device event notifications from MFPs. The device notification service of the eConnector connector calls the Subscribe( ) method of MFP output management to subscribe to events. A connector server may have multiple network adapters. If device notifications are attached to different adapters, certain events can be lost or disabled. By way of particular example, a notification service may be attached By way of particular example, there can be problems when a device notification service is attached to a network mapper (NMAP) adapter instead of a connector's network interface card (NIC) adapter. By way of example, due to a difference in adapter assignments, users may be able manually perform authentication by logging in with their credentials on an MFP, but they cannot perform card authentication.

A connector is bound to a specific adapter in the system. If the device notification service is specifically bound to a second adapter, the service may ignore event-related traffic received from the MFP on the first adapter. In addition, if the adapter to which the device notification service is bound fails, the service may fail if other adapters are not used.

Example embodiments herein solves such problems by allowing the device notification service to blind to the multiple correct adapters simultaneously. It can be described as follows:

The connector gets list of local IP addresses
The connector removes unavailable adapters.
The connector calls MFP output management to subscript to events.
The MFP checks each IP address to make sure it is subscribed correctly.
The MFP sends events to the connector.
The device notification service can use additional adapters on the same network. If a failure occurs, another adapter will be used so that the device notification service can continue to work uninterrupted. The connector can display a list of IP addresses to allow user selection. The connector can automatically delete unavailable or disabled adapters according to administrator settings. For example, delete the following adapters:

Throughput=0
Physical address starts with 00
VPN adapter
Virtual adapter

If the connector server configured by the user has multiple network adapters on the same physical network and protocol subnet, a user may experience unexpected results. Example embodiments herein create multiple TCP/IP connections for a single session. It can be described as follows:

1. The connector queries the DNS server for the IP address associated with the connector server.
2. The connector displays a list of IP addresses to the user to allow the user to select or automatically delete unavailable or disabled adapters according to administrator settings. For example, delete the following adapters.
   a. Throughput=0
   b. Physical address starts with 00
   c. VPN adapter
   d. Virtual adapter
   e) Wi-Fi adapter
3. The connector calls the MFP output management and passes all IP addresses to subscribe to events.
4. The MFP checks each IP address to make sure it is subscribed correctly.
5. The MFP sends the event to the subscribed IP addresses A device notification service can use additional adapters on the same network. If a failure occurs, another adapter will be used so that the device notification service can continue to work uninterrupted. The connector can display a list of IP addresses to allow the user to select. The connector can automatically delete unavailable or disabled adapters according to administrator settings. For example, delete the following adapters.

Throughput=0
Physical address starts with 00
VPN adapter
Virtual adapter
Wi-Fi adapter FIG. 1 illustrates an example embodiment of a system 100 for server connection using multiple network adapters. MFPs, such as MFPs 104, 108 and 112 are in data communication with connector server 116 and print server 120 via network cloud 124. Network cloud 124 is suitably comprised of a local area network (LAN), a wide area network (WAN), which may comprise the Internet, or any suitable combination thereof. Data is suitably exchanged on any suitable wireless or wired network. Wireless communication is suitably handled by Wi-Fi hotspot 126.

In the illustration, MFP 104 includes a touchscreen user interface 127, shown in exploded view at 124'. Print jobs that have been sent to print server 120 can be released by logging in at touchscreen user interface 127, or by a smart card such as NFC or RFID. Login can also be accomplished by reading a barcode, such as QR code 128 on a user device such as smartphone 132. Once logged in, a web interface to print server 120 is suitably displayed on touchscreen 125. However, connection between MFP 104 and print server 120 is handled by connector server 116. Connector server 116 subscribes to device or event notification from MFP 104, and passes a web interface from print server 120. Event notifications are relayed from MFP 104 to print server 120, suitably by subscription.

Connector server 116 includes two or more network adapters, such as an NMAP, NIC, virtual private network (VPN), virtual adapter or Wi-Fi adapter. Certain events, such as a manual login on MFP 104, may arrive through one adapter while other events, such as smartcard or QR code login, may arrive through another adapter. Connector server 116 can relay all monitored events from MFP 104 to print server 120, regardless of which network adapter of the connector server actually received a notification.

Figure 2:
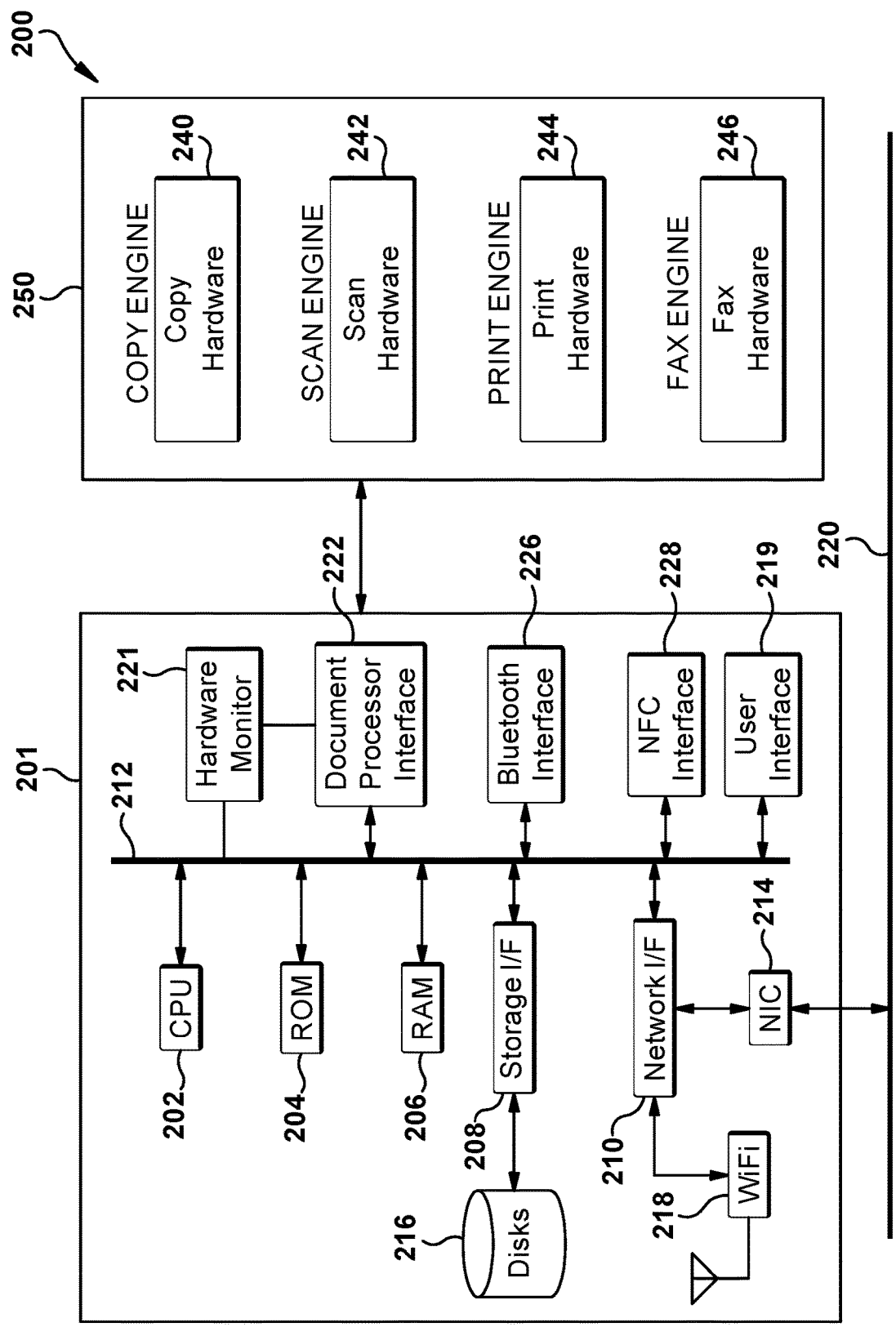
FIG. 2 is an example embodiment of a networked digital device, such as a multifunction peripheral.

Turning now to FIG. 2, illustrated is an example embodiment of a networked digital device comprised of document rendering system 200 suitably comprised within an MFP, such as with MFPs 104, 108 and 112 of FIG. 1. It will be appreciated that an MFP includes an intelligent controller 201 which is itself a computer system. Thus, an MFP can itself function as a server with the capabilities described herein. Included in intelligent controller 201 are one or more processors, such as that illustrated by processor (CPU) 202. Each processor is suitably associated with non-volatile memory, such as read-only memory (ROM) 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired interface or physical network connection 220, or to a wireless data connection via wireless network interface 218. Example wireless data connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like.

Processor 202 can also be in data communication with any suitable user input/output (I/O) interface 219 which provides data communication with user peripherals, such as displays, keyboards, mice, track balls, touch screens, or the like.

Also in data communication with data bus 212 is a document processor interface 222 suitable for data communication with the document rendering system 200, including MFP functional units. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Figure 3:
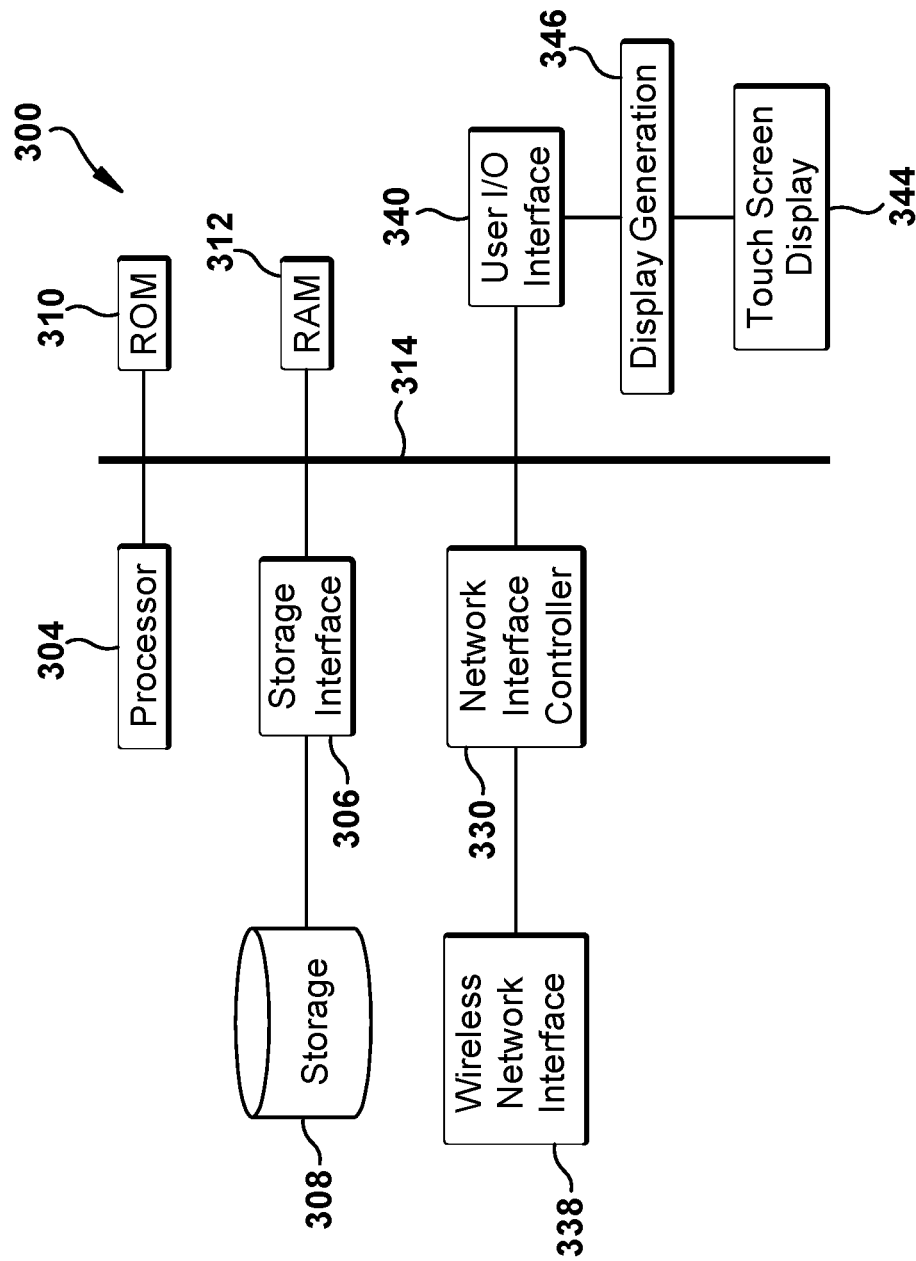
FIG. 3 is an example embodiment of a digital device system, such as a server.

Turning now to FIG. 3, illustrated is an example embodiment of a digital data processing device 300 such as connector server 116 and print server 120 of FIG. 1. Components of the digital data processing device 300 suitably include one or more processors, illustrated by processor 304, memory, suitably comprised of read-only memory 310 and random access memory 312, and bulk or other non-volatile storage 308, suitably connected via a storage interface 306. A network interface controller 330 suitably provides a gateway for data communication with other devices, such as via wireless network interface 338. A user input/output interface 340 suitably provides display generation 346 providing a user interface via touchscreen display 344, suitably displaying images from display generator 346. It will be understood that the computational platform to realize the system as detailed further below is suitably implemented on any or all of devices as described above.

Figure 4:
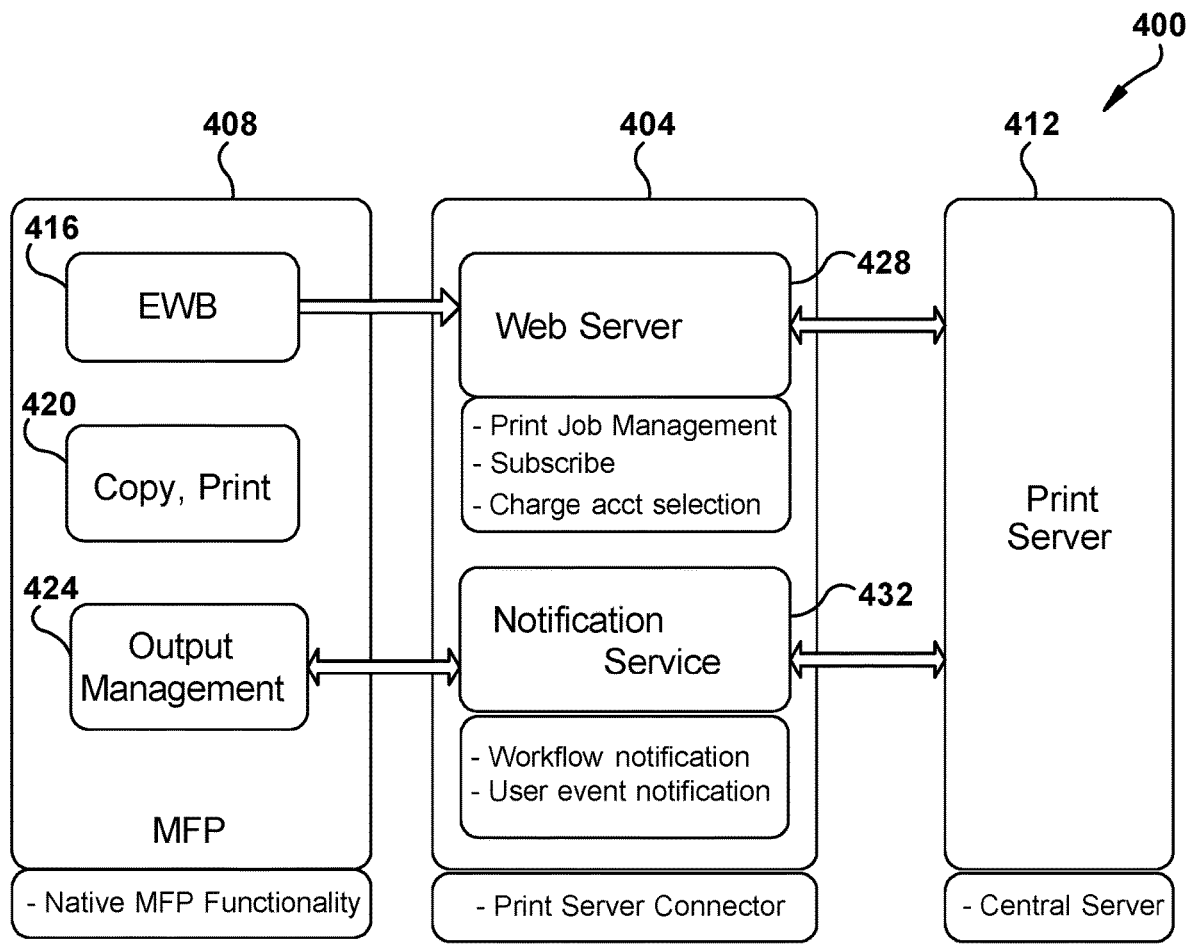
FIG. 4 is a block diagram of an example embodiment of a system for server connection using multiple adapters.

FIG. 4 illustrates a block diagram 400 of an example embodiment of a system for server connection using multiple adapters. Connector server 404 relays notifications and web service between MFP 408 and print server 412. MFP 408 includes an embedded web browser (EWB) 416, document processing functionality 420, such as copying, scanning or printing, and output management functionality 424. Connector server 404 includes a web server 428 to pass web information from embedded web browser 416 to print server 412. Such web information may comprise print job management, event notification subscriptions and charge account management. Connector server 404 also includes notification service 432 to relay output management information 424 from MFP 408 to print server 412. Example events are workflow notifications and user event notifications.

Figure 5:
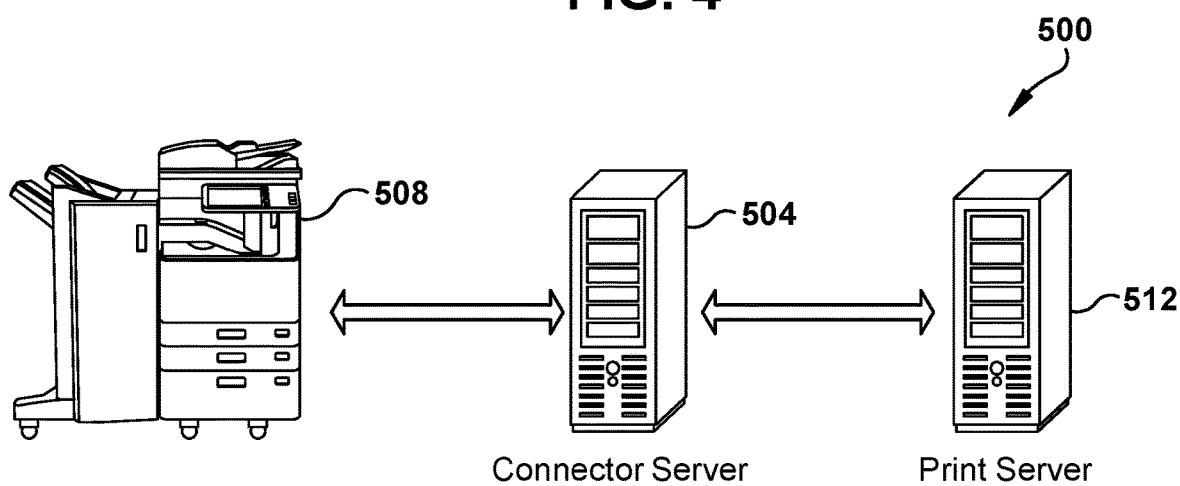
FIG. 5 is an example embodiment of a printing system wherein connector server relays data between a multifunction peripheral and a print server.

FIG. 5 illustrates an example embodiment of a printing system wherein a connector server 504 relays data between MFP 508 and print server 512.

Figure 6:
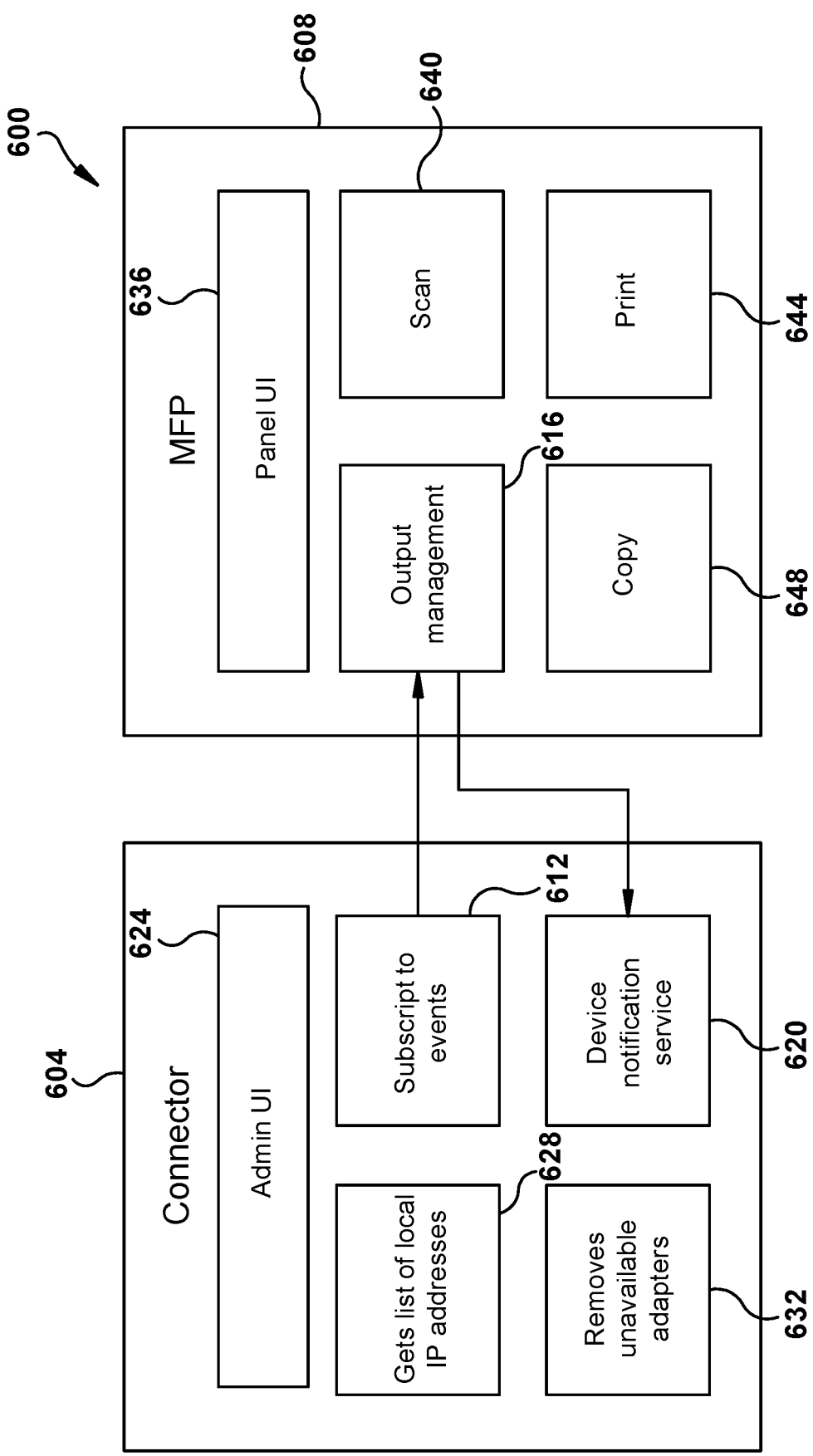
FIG. 6 is a block diagram of an example embodiment of data connection between a connector server and a multifunction peripheral.

FIG. 6 illustrates a block diagram of an example embodiment of data connection 600 between connector server 604 and MFP 608. At block 612, connector server 604 subscribes to output management, illustrated at block 616 of MFP 608. Event notifications from block 616 are relayed from MFP 608 to a connector event notification service at block 620. Connector server 604 also comprises an administrator user interface (UI) 624, and functions to get a list of local IP addresses at block 628 and remove unavailable adapters at block 632. MFP 608 includes panel user interface 636, and functions to scan at block 640, print at block 644 and copy at block 648.

FIG. 7 is a flowchart 700 of an example embodiment of connector server operation. The process commences at block 704 and proceeds to block 708 where a list of local IP addresses is obtained. If unavailable network adapters are selected for deletion at block 712, this is done at block 716, suitably based on settings or user selection. The process then proceeds to block 720 where a determination is made as to whether IP address remain. If unavailable adapters are not selected for disablement at block 712, the process proceeds directly to block 720. If IP addresses remain at block 720, a call is made for MFP output management at block 724, and a next IP address is selected at block 728, where the process returns to block 720. Once no IP addresses exist or remain at block 720, the process ends at block 732.

FIG. 8 is a flowchart 800 of an example embodiment of MFP operation. The process commences at block 804 and proceeds to block 808, at which it remains until such time an event is received. Once an event is receive, it is sent to a subscribing connector server at block 812, and the process returns to block 808 until a next event occurs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
a processor and associated memory;
the processor configured to determine a plurality of network adapters configured for data communication with each of a plurality of associated multifunction peripherals (MFPs);
the processor further configured to subscribe to an event notification service with the each of the MFPs via each of the plurality of network adapters;
the processor further configured to receive event notifications from the MFPs via each of the plurality of network adapters; and
the processor further configured to output received event notifications to an associated print server via one or more of the plurality of network adapters.

2. The system of claim 1 wherein the processor is further configured to:
identify non-functional adapters; and
remove the non-functional adapters from data communication with the plurality of MFPs.

3. The system of claim 2 wherein the processor is further configured to:
identify IP addresses of each of the plurality of MFPs; and
verify a subscription with each identified IP address.

4. The system of claim 3 wherein the event notifications are comprised of workflow notifications or user event notifications.

5. The system of claim 4 wherein the processor if further configured to:
receive print job management data from the MFPs via each of the plurality of network adapters; and
output received print job management data to the print server.

6. The system of claim 5 wherein the processor if further configured to:
receive charge account data from the MFPs via each of the plurality of network adapters; and
output received charge account data to the print server.

7. The system of claim 6 wherein the plurality of network adapters include two or more of NMAP adapters, NIC adapters, VPN adapters, virtual adapters or Wi-Fi adapters.

8. The system of claim 7 wherein the non-functional adapters include one or more of:
adapters having a throughput of zero,
adapters having a physical address starting with 00,
VPN adapters,
NMAP adapters,
NIC adapters,
virtual adapters, or
wireless adapters.

9. A method comprising:
determining a plurality of network adapters;
configuring the plurality of network adapters configured for data communication with a plurality of associated multifunction peripherals (MFPs);
subscribing to an event notification service with each of the plurality MFPs via each of the plurality of network adapters;
receiving event notifications from the MFPs via each of the plurality of network adapters; and
outputting received event notifications to an associated print server via one or more of the plurality of network adapters.

10. The method of claim 9 further comprising:
identifying non-functional adapters; and
removing non-functional adapters from data communication with the plurality of MFPs.

11. The method of claim 10 further comprising
identifying IP addresses of each of the plurality of MFPs; and
verifying a subscription with each identified IP address.

12. The method of claim 11 wherein event notifications are comprised of workflow notifications or user event notifications.

13. The method of claim 12 further comprising:
receiving print job management data from the MFPs via each of the plurality of network adapters; and
outputting received print job management data to the print server.

14. The method of claim 13 further comprising:
receiving charge account data from the MFPs via each of the plurality of network adapters; and
outputting received charge account data to the print server.

15. The method of claim 14 wherein the plurality of network adapters include two or more of NMAP adapters, NIC adapters, VPN adapters, virtual adapters or Wi-Fi adapters.

16. The method of claim 15 wherein non-functional adapters include one or more of:
- adapters having a throughput of zero,
- adapters having a physical address starting with 00,
- VPN adapters,
- NMAP adapters,
- NIC adapters,
- virtual adapters, or
- wireless adapters.

17. A method comprising:
- identifying network addresses for each of a plurality of network devices;
- identifying a plurality of network adapters;
- subscribing to device notifications from each of the network devices over two or more of the identified plurality of networked adapters;
- receiving device notifications from the network devices over two or more of the identified plurality of network adapters; and
- outputting received device notifications to an associated device server via one or more of the network adapters.

18. The method of claim 17 further comprising:
- identifying one or more of the plurality of network adapters that are non-functional; and
- removing all network adapters that are identified as non-functional.

19. The method of claim 17 further comprising:
- receiving print job management data from the network devices via each of the plurality of network adapters;
- outputting received print job management data to the associated device server; and
- receiving charge account data from the network devices via each of the plurality of network adapters; and
- outputting received charge account data to the associated device server.

20. The method of claim 19 wherein the plurality of network adapters include two or more of:
- VPN adapters,
- NMAP adapters,
- NIC adapters,
- virtual adapters, or
- wireless adapters.

* * * * *